United States Patent

Kaplow et al.

[15] 3,640,731
[45] Feb. 8, 1972

[54] SHELF STABLE EGG PRODUCTS

[72] Inventors: Milton Kaplow, White Plains; Robert E. Klose, Bronx, both of N.Y.

[73] Assignee: General Foods Corporation, White Plains, N.Y.

[22] Filed: Apr. 3, 1969

[21] Appl. No.: 813,279

[52] U.S. Cl. ............................................................99/113
[51] Int. Cl. .............................................................A23l 1/32
[58] Field of Search .........................................99/113, 114

[56] References Cited

UNITED STATES PATENTS 2,786,770   2/1957   Rapport....................................99/113
3,202,514   8/1965   Burgess et al............................99/2

Primary Examiner—Raymond N. Jones
Assistant Examiner—Robert M. Elliott
Attorney—Thomas V. Sullivan, Bruno P. Struzzi and Jerome J. Norris

[57] ABSTRACT

Preparation of shelf stable egg products wherein dried egg whites, whole egg solids, or egg yolks are blended with 20 percent to 40 percent by product weight edible polyhydric alcohol to form a homogeneous mixture, combining the mixture with starch hydrolyzate solids and an antimycotic to form an emulsion containing about 9.7 percent to 35 percent starch hydrolyzate solids and about 14 percent to 32 percent moisture, and heat setting the emulsion.

3 Claims, No Drawings

SHELF STABLE EGG PRODUCTS

SUMMARY

This invention relates to egg products which are shelf stable against microorganic decomposition, to the extent that the necessity of further treatments to provide bacteriostasis and protection against development of molds is avoided. The invention further relates to new and improved processes for preparing egg products complete in flavor, texture and appearance as compared to freshly prepared egg products and which require neither refrigeration nor sterilization in order to impart stability against spoilage to the products.

The concept of intermediate moisture food products, that is, products having a moisture content in excess of 10 percent and substantially below 75 percent is set forth in U.S. Pat. No. 3,202,514. In general, an increase in the moisture level of many foods will increase the palatability thereof, however, any significant elevation of the moisture level of such foods above 10 percent leads to microbiological decomposition unless such foods are packaged in a hermetically sealed container and commercially sterilized or maintained in a frozen or refrigerated state throughout the period of distribution and storage by the consumer. These packaging or preservation methods are expensive and not convenient to the consumer under all anticipated conditions of use.

It is an object of this invention to provide moist fully cooked egg products, complete in flavor, texture and appearance as freshly prepared egg products, and having a high degree of palatability such that the consumer receives them favorably.

A further object of this invention is to provide moist fully cooked egg products, complete in flavor, texture and appearance as freshly prepared egg products, and having microbiological stability such that it can be packaged using conventional moisture protective wrapping materials while eliminating the necessity for hot packing or thermal sterilization incident to packaging and can be stored for extended periods of time under nonrefrigerated conditions without incurring significant risk of microbiological spoilage, or recontamination or of product discoloration; having the property of lending itself to simple processing under ambient temperatures without the necessity for packaging in such a manner as to prevent occlusion of air and assuring intimate contact of the product with the packaging material.

A still further object of this invention is to provide new and improved processes of preparing egg products in such a manner that neither refrigeration nor sterilization is required in order to impart stability against spoilage to the products.

The term "egg products" as it is employed in the present context is to be understood as meaning any kinds or types of emulsions or heat-set products thereof comprising whole egg solids, egg whites, egg yolks, or combinations thereof.

In general, the shelf stable egg products of this invention are formulated by combining various edible polyhydric alcohols and either dried egg whites, dried egg yolks or dried whole egg solids. Starch hydrolyzate solids and the remaining dried ingredients are next dissolved in water and the solution is then combined with the first mixture and heat set by boiling or frying to form textures similar to that of natural egg. The product is then allowed to cool to room temperature and is then packaged.

The emulsion employed to prepare the egg products in this invention are formulated on the principles of Aw, e.g., the ability of the soluble solids of the emulsion to limit the amount of "free" water available to bacteria; the bacteria's inability to survive this condition; and the subsequent shelf stability or product stability obtained by virtue of this condition.

The Aw value is a direct measure of water vapor which is a function of unbound water. It is determined by dividing the moles of water plus the moles of soluble solids into the moles of water. The lower the Aw value, the more stable the egg product against microbiological decomposition, e.g., 0.80 Aw in a product indicates more stability than 0.90 Aw in a similar type product. Some of the ingredients employed in the Aw emulsion of this invention cannot be directly calculated for their effects on Aw because of the unknown quantities of soluble solids which they contain. Therefore, samples of egg product measured electronically for Aw are usually found to have a somewhat lower Aw value as compared to those calculated directly.

To compute the complete Aw, the Aw lowering of the calculated ingredients are added together and subtracted from "1," "1" being equivalent to 100 percent water vapor or maximum water vapor which would be produced if none of the free water were bound by soluble solids. Thus a calculated Aw of 0.96 indicates an Aw lowering of 0.04.

The relative weight percent of water-soluble solids to the moisture content of the egg products, when initially incorporated into the egg during its manufacture and preparatory to packaging determines the ultimate functionality of the solids in providing the requisite bacteriostatic effect. Usually the level of moisture will range from 14 to 32 percent. The level of water-soluble solids may be varied as may the level of moisture initially incorporated within the desired ranges. However, in varying these levels the relationship of the water-soluble solids in solution to the water should be controlled so as to afford the desired osmotic pressure. A good rule to observe in this connection is to be sure that the water-soluble solids available for solution are at least equal to the weight of moisture present, although in some cases it is possible that a lower level of water-soluble solids might afford some protection against microbiological decomposition provided an equivalent degree of osmotic pressure is available to protect the product. It will be found, however, that the level of starch hydrolyzate solids employed in the present invention will constitute a major percent by weight of the water-soluble solids.

The novel egg products of this invention, when prepared in the manner disclosed, is characterized by substantially complete resistance to bacterial decomposition, when the level of moisture ranges from about 14 to 32 percent, and the Aw of the egg product emulsion and heat-set egg product is between about 0.65 and 0.80; however, as a precautionary measure against the growth of yeast and molds certain antimycotic agents are incorporated in the emulsion at sufficient levels to prevent the growth of such organisms. Sorbate salts such as potassium sorbate as well as sorbic acid can be used either separately or in combination. Propylene glycol which may be used either alone or with other humectants like sorbitol to impart a degree of product softness or tenderness has also been found to serve as an antimycotic. Other antimycotic agents will be apparent to those skilled in the art. The amount of antimycotic agent added is selected so as to produce the desired results and will constitute a minor proportion of the product, say from about 0.1 to about 2.5 percent of the total weight, depending on the particular antimycotic and the particular product composition, although even lower levels in the order of 50 p.p.m. can be employed in the case of some antimycotics such as pimaricin. Potassium sorbate in a water solution can be sprayed into the surface of the egg product, or the product can be dipped in this solution; other antimycotics lend themselves to such surface application as esters of the parabens (para-hydroxy benzoate) such as propyl and methyl parabens (methyl para-hydroxy benzoate). Cellophane and other enwrapments for the food can be spray coated with a sorbic acid solution but impregnation or dusting with sorbic acid or potassium sorbate is preferred. Antimycotics which can generally be used are benzoic acid, sodium benzoates, propionic acid, sodium and calcium propionate, sorbic acid, potassium and calcium sorbate, propylene glycol, diethyl pyrocarbonate, menadione sodium bisulfite.

The shelf stable egg products which are packaged in nonhermetic pouches have the appearance, texture and color not unlike conventional heat-set egg products. When removed from the pouch, the moist and soft product is warmed just prior to consumption.

The dry ingredients chosen to produce the balanced shelf stable egg products will preferably include starch hydrolyzate solids, dried egg whites, dried egg yolks, dried whole egg solids, common table salt, and potassium sorbate. Nondry ingredients employed to prepare the shelf stable egg product will include edible polyhydric alcohols and water.

Starch hydrolyzates of low sweetness such as dextrin and hydrolyzed cereal solids are the principal sources of water-soluble solids of the egg product Aw emulsion and may range from about 9.7 to 35 percent of the emulsion depending upon the particular starch hydrolyzate or mixture thereof employed to provide the desired bacteriostatic protection. As the moisture content of the product increases in the intermediate moisture range, the level of a given starch hydrolyzate will correspondingly increase in order to maintain a sufficient bacteriostatic effect. The quantity of starch hydrolyzate chosen will also vary depending upon the presence and level of auxiliary water-soluble solids which produce a similar increase in osmotic pressure to the Aw emulsion; thus, a variety of low average molecular weight materials may be included as part of the water-soluble solids in the Aw emulsion and would have the effect of augmenting the starch hydrolyzates in their role of providing sufficient osmotic pressure to prevent bacterial decomposition of the egg product. In this regard, it must also be said that the desire to have an egg product as close to conventional nonsweet naturally occurring egg products will necessarily limit the amount and type of starch hydrolyzate material to be employed in this invention.

The polyhydric alcohols having two or more hydroxyl groups which may be used include glycerol, sorbitol, propylene glycol, mannitol, mixtures thereof, and the like. In general, the polyhydric alcohols employed should be of low molecular weight and present in amounts between about 20 to 40 percent so as to offer a substantial effect in increasing the osmotic pressure of the Aw emulsion used to form the egg product. These polyhydric alcohols assist in depleting the moisture of the egg product by substituting for a portion of the moisture present in the interior of the product and causing moisture transfer to the exterior thereof.

In general, heat setting the egg containing emulsion gives the desired egglike texture, however, if desired, gelling gums such as agar, alginate etc., may be used to assist in the formation of an egglike texture.

Following are examples setting forth certain preferred but nonlimiting formulations which embody the principles of the invention.

EXAMPLE I

| Ingredients | Parts by Weight | % |
| --- | --- | --- |
| Dried Egg Whites | 65.0 | 13.0 |
| Water | 150.0 | 30.0 |
| Glycerol | 150.0 | 30.0 |
| Propylene Glycol | 10.0 | 2.0 |
| Potassium Sorbate | 1.5 | 0.3 |
| Sodium Chloride | 10.0 | 2.0 |
| Dextrin | 113.5 | 22.7 |
| | 500.0 | 100.0 |

The egg whites, propylene glycol and glycerol are blended into a homogeneous mix. Next the remaining solids are dissolved in water and the solution is added to the homogeneous mix to form an emulsion. The emulsion is then heat set by boiling at around 210° F. to form a texture similar to that of natural egg products and stored in a nonhermetic package. The Aw of the egg product emulsion before heat setting was around 0.77, and the Aw after heat setting was about 0.72. The moisture content of the heat-set egg product was about 28.4 percent.

Microbiological evaluation of the liquid egg product emulsion of Example I disclosed a standard plate count, mold count and yeast count of less than 10 when tested after 4 weeks at 100° F. The test for salmonella under these conditions disclosed none present.

Example II

| Ingredients | Parts by Weight | % |
| --- | --- | --- |
| Whole Egg Solids | 130.0 | 26.0 |
| Water | 150.0 | 30.0 |
| Glycerol | 150.0 | 30.0 |
| Dextrin | 48.5 | 9.7 |
| Sodium Chloride | 10.0 | 2.0 |
| Propylene Glycol | 10.0 | 2.0 |
| Potassium Sorbate | 1.5 | 0.3 |
| | 500.0 | 100.0 |

The emulsion was prepared as in Example I except that the heat setting was accomplished by frying the emulsion on a Teflon coated electric griddle at 275° F. The Aw of this egg product emulsion before heat setting was 0.79, however, after heat setting the egg product's Aw was 0.67. Examination revealed the moisture content of this heat-set egg product to be about 25.7 percent. Microbiological tests employed in Example I were repeated here and the results were substantially the same.

Although the invention has been described with reference to specific examples, it will be obvious to those skilled in the art that various other embodiments can be practiced within the scope of this invention.

What is claimed is:

1. An egg product emulsion with an Aw between 0.65 and 0.80 and adapted to be packaged in a nonhermetic packaging material without sterilization and stored for long periods of time without refrigeration, said emulsion having a moisture range from 14 to 32 percent by weight and water-soluble solids greater than the weight of moisture; comprising egg product, an edible polyhydric alcohol in amounts of about 20 to 40 percent by weight of the emulsion, water-soluble starch hydrolyzate solids in amounts between about 9.7 to 35 percent by weight of the emulsion, and an effective level of antimycotic to prevent mold growth.

2. A heat-set egg product with an Aw between 0.65 and 0.80 and adapted to be packaged in a nonhermetic packaging material without sterilization and stored for long periods of time without refrigeration, having a moisture content between 14 to 32 percent by weight and water-soluble solids greater than the weight of moisture; said heat-set product comprising egg product, an edible polyhydric alcohol in amounts of about 20 to 40 percent by weight of the product, water-soluble starch hydrolyzate solids in amounts between about 9.7 to 35 percent by weight of the product, and an effective level of antimycotic to prevent mold growth.

3. A process for preparing shelf stable egg products with an Aw between 0.65 and 0.80 and adapted to be packaged in a nonhermetic packaging material without sterilization, and stored for long periods of time without refrigeration, comprising blending dried egg product selected from the group consisting of egg whites, whole egg solids, and egg yolks, and an edible polyhydric alcohol in amounts of about 20 to 40 percent of the product, into a homogeneous mixture, combining said mixture with a solution comprising starch hydrolyzate solids and an antimycotic to form an emulsion containing about 9.7 to 35 percent starch hydrolyzate solids, about 14 to 32 percent moisture, and heat setting the emulsion.

* * * * *